United States Patent
Wang et al.

(10) Patent No.: US 9,836,284 B2
(45) Date of Patent: Dec. 5, 2017

(54) HTML5 GRAPH LAYOUT FOR APPLICATION TOPOLOGY

(71) Applicant: VMware, Inc., Palo Alto, CA (US)

(72) Inventors: Jialiang Wang, San Jose, CA (US); Komal Nitin Mangtani, Los Altos, CA (US); Sesh Jalagam, Union City, CA (US)

(73) Assignee: VMware, Inc., Palo Alto, CA (US)

( * ) Notice: Subject to any disclaimer, the term of this patent is extended or adjusted under 35 U.S.C. 154(b) by 62 days.

(21) Appl. No.: 14/307,963

(22) Filed: Jun. 18, 2014

(65) Prior Publication Data

US 2015/0370538 A1    Dec. 24, 2015

(51) Int. Cl.
   G06F 9/44    (2006.01)
(52) U.S. Cl.
   CPC ................................ *G06F 8/34* (2013.01)
(58) Field of Classification Search
   CPC ................................................. G06F 9/44
   USPC ............................... 717/105, 104, 120, 121
   See application file for complete search history.

(56) References Cited

U.S. PATENT DOCUMENTS

| | | | | |
|---|---|---|---|---|
| 6,011,559 | A * | 1/2000 | Gangopadhyay | G06F 8/71 345/440 |
| 6,836,821 | B2 * | 12/2004 | Moore | G06F 3/0601 711/114 |
| 7,210,095 | B1 * | 4/2007 | Mor | G06F 17/30893 707/E17.117 |
| 7,290,216 | B1 | 10/2007 | Kawahara et al. | |
| 7,725,820 | B2 * | 5/2010 | Gibbons | G06Q 10/10 715/255 |
| 7,800,614 | B2 | 9/2010 | Johnson et al. | |
| 7,827,527 | B1 | 11/2010 | Chiluvuri | |
| 7,889,679 | B2 * | 2/2011 | Canright | H04L 41/12 370/252 |
| 8,392,877 | B1 | 3/2013 | Chiluvuri | |
| 8,397,153 | B1 | 3/2013 | Lee et al. | |
| 8,429,140 | B1 * | 4/2013 | Lolayekar | G06F 17/30 707/694 |
| 8,527,943 | B1 | 9/2013 | Chiluvuri | |
| 8,560,671 | B1 * | 10/2013 | Yahalom | H04L 67/1097 709/224 |
| 8,738,745 | B1 * | 5/2014 | Brandwine | G06F 9/455 709/218 |
| 8,910,156 | B1 * | 12/2014 | Kenchammana-Hosekote | G06F 9/45533 718/1 |

(Continued)

OTHER PUBLICATIONS

U.S. Appl. No. 14/307,981, Final Office Action dated Feb. 9, 2017 Consists of 15 pages.

(Continued)

*Primary Examiner* — Jae Jeon
(74) *Attorney, Agent, or Firm* — Patterson & Sheridan LLP (57) ABSTRACT

A user may create a blueprint that specifies an application's architecture, including virtual machines (VM) nodes, software services and application components within the VM nodes. To do so, the user manipulates a graphical user interface (GUI) rendered by a Scalable Vector Graphics (SVG) layout engine. The SVG layout engine parses declarative layout configurations and translates the declarative layout into SVG elements that visually represent the blueprint. The SVG layout engine dynamically calculates absolute positions and sizes of child elements based on the declarative layout.

20 Claims, 4 Drawing Sheets

(56) References Cited

U.S. PATENT DOCUMENTS

| | | |
|---|---|---|
| 8,984,448 B2 | 3/2015 | Lewin et al. |
| 9,046,982 B2 | 6/2015 | Horsman et al. |
| 9,075,631 B2 | 7/2015 | Lewin et al. |
| 9,195,362 B2 | 11/2015 | Lewin et al. |
| 2002/0109729 A1* | 8/2002 | Dutta ................ G06Q 30/02 715/790 |
| 2002/0138518 A1* | 9/2002 | Kobayashi ........ G06F 17/3092 715/227 |
| 2003/0112958 A1 | 6/2003 | Beaudoin et al. |
| 2003/0128390 A1* | 7/2003 | Yip .................. H04N 1/00204 358/1.18 |
| 2004/0111672 A1* | 6/2004 | Bowman ............. G06F 9/4443 715/234 |
| 2004/0111673 A1* | 6/2004 | Bowman ............. G06F 9/4443 715/234 |
| 2004/0140992 A1* | 7/2004 | Marquering ...... G06K 9/00449 715/700 |
| 2004/0205594 A1 | 10/2004 | Arora et al. |
| 2004/0254864 A1 | 12/2004 | Mitsuoka et al. |
| 2005/0015755 A1* | 1/2005 | Holmes ............. G06F 17/5045 717/136 |
| 2005/0278440 A1 | 12/2005 | Scoggins |
| 2006/0031749 A1* | 2/2006 | Schramm ........ G06F 17/30056 715/201 |
| 2006/0041661 A1* | 2/2006 | Erikson ........... G06F 17/30887 709/225 |
| 2007/0016592 A1* | 1/2007 | Ferla ............... G06F 17/30905 |
| 2007/0054670 A1 | 3/2007 | Kalika et al. |
| 2007/0118793 A1 | 5/2007 | Arora et al. |
| 2007/0180133 A1 | 8/2007 | Vedantham et al. |
| 2007/0214206 A1 | 9/2007 | Malloy et al. |
| 2007/0242082 A1 | 10/2007 | Lathrop et al. |
| 2008/0095176 A1* | 4/2008 | Ong ................... H04L 12/5695 370/400 |
| 2008/0208790 A1 | 8/2008 | Oshima et al. |
| 2008/0244595 A1* | 10/2008 | Eilam ..................... G06F 8/10 718/104 |
| 2008/0262833 A1 | 10/2008 | Kano et al. |
| 2010/0088624 A1 | 4/2010 | Bligh et al. |
| 2010/0094819 A1* | 4/2010 | Bornhoevd ........ G06F 17/3089 707/705 |
| 2010/0122192 A1 | 5/2010 | Hanna |
| 2010/0171750 A1* | 7/2010 | Eberhard ................ G06T 11/60 345/589 |
| 2010/0322527 A1* | 12/2010 | Fablet ................. G06F 17/2252 382/232 |
| 2011/0029882 A1 | 2/2011 | Jaisinghani |
| 2011/0072353 A1* | 3/2011 | Le Pennec ........... H04L 43/045 715/737 |
| 2011/0126129 A1* | 5/2011 | Nagahara ................ G06T 11/60 715/753 |
| 2011/0161792 A1 | 6/2011 | Florence |
| 2011/0280550 A1* | 11/2011 | Shimada ............. H04N 9/8715 386/248 |
| 2012/0192047 A1 | 7/2012 | Slatter et al. |
| 2012/0192092 A1 | 7/2012 | Slatter et al. |
| 2012/0303670 A1* | 11/2012 | Gillen .................. G06F 9/5072 707/797 |
| 2012/0330984 A1 | 12/2012 | Fablet et al. |
| 2013/0019189 A1 | 1/2013 | Stewart et al. |
| 2013/0132850 A1 | 5/2013 | Subramanian et al. |
| 2013/0145118 A1* | 6/2013 | Liu ..................... G06F 12/0646 711/170 |
| 2013/0151707 A1* | 6/2013 | Boutin ................. G06F 9/5077 709/226 |
| 2013/0232463 A1 | 9/2013 | Nagaraja et al. |
| 2013/0232480 A1 | 9/2013 | Winterfeldt et al. |
| 2013/0232497 A1 | 9/2013 | Jalagam et al. |
| 2013/0232498 A1 | 9/2013 | Mangtani et al. |
| 2013/0246924 A1 | 9/2013 | Tan et al. |
| 2013/0305130 A1 | 11/2013 | Slatter et al. |
| 2014/0019899 A1 | 1/2014 | Cheng et al. |
| 2014/0025816 A1 | 1/2014 | Otani |
| 2014/0028685 A1 | 1/2014 | Weskamp et al. |
| 2014/0379898 A1 | 12/2014 | Schmit et al. |
| 2015/0113453 A1* | 4/2015 | Thimbleby ......... G06F 3/04845 715/765 |
| 2015/0242204 A1 | 8/2015 | Hassine et al. |
| 2015/0370445 A1 | 12/2015 | Wang et al. |

OTHER PUBLICATIONS

U.S. Appl. No. 14/307,997, Non Final Office Action dated Mar. 14, 2017, Consists of 11 pages.

\* cited by examiner

HTML5 GRAPH LAYOUT FOR APPLICATION TOPOLOGY

CROSS-REFERENCE TO RELATED APPLICATION(S)

This application is related to U.S. patent application Ser. No. 14/307,997, entitled "HTML5 Graph Overlays for Application Topology,", and to U.S. patent application Ser. No. 14/307,981, entitled "Connection Paths for Application Topology", all of which are assigned to the assignee of this application, have been filed on the same day of this application, and the entire contents of which are incorporated by reference herein.

BACKGROUND

HyperText Markup Language 5 (HTML5) is an increasingly popular markup language used for structuring and presenting content for the World Wide Web. One component of HTML5 is Scalable Vector Graphics (SVG), which is an XML-based vector image format for describing two-dimensional graphics applications and images, and a set of related graphics script interfaces. While SVG is a powerful graphic specification, SVG lacks native support for a layout mechanism. As a result, a developer must specify absolute positions and sizes for all SVG elements, including text, images, backgrounds, and shapes, within the elements' containers. Manually specifying these absolute positions and sizes greatly reduces developer productivity and raises the cost of application maintenance. As such, there are challenges for developers seeking to create a web-based graphical user interface that renders complex graphical topologies and figures.

SUMMARY

Accordingly, one or more embodiments provide a Scalable Vector Graphics (SVG) layout engine that parses declarative layout configurations and translates the declarative layout into SVG elements to render complex graphical topologies. In one example use case, the SVG layout engine may generate a graphical user interface (GUI) for creating application blueprints that specify an application's architecture, including virtual machines (VM) nodes, software services and application components within the VM nodes. The application blueprints define the structure of the application, enable the use of standardized application infrastructure components, and specify installation dependencies and default configurations. The application blueprints define the topology for deployment in an infrastructure-agnostic manner to be portable across different cloud computing environments. The SVG layout engine dynamically calculates absolute positions and sizes of child elements based on the declarative layout to visually represent the application blueprint.

Embodiments of the present disclosure provide a method of generating a user interface. The method includes retrieving structural information comprising a topology of virtual computing resources and application components executing thereon. The structural information specifies a plurality of nodes corresponding to the virtual computing resources and a plurality of child elements of the plurality of nodes. The method further includes generating a declarative layout associated with the plurality of child elements of the plurality of nodes according to the structural information, and generating a plurality of scalar vector graphics (SVG) elements that renders the plurality of child elements based on the declarative layout. The method includes rendering, on a display device, a graphical user interface comprising the plurality of SVG elements, wherein the graphical user interface visually represents the topology.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
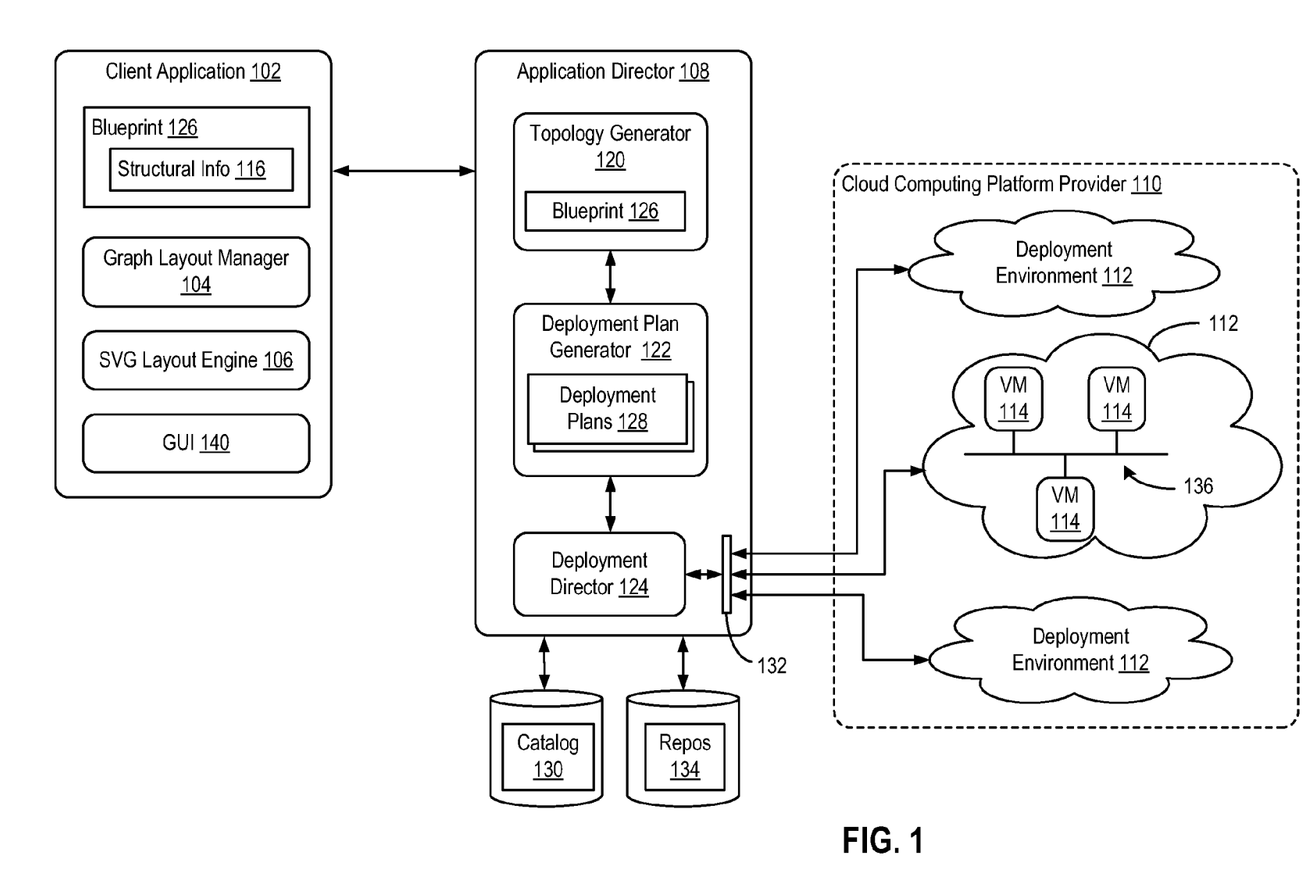
FIG. 1 depicts a system for generating a blueprint of an application to be deployed in a cloud computing environment, according to one embodiment of the present disclosure.

FIG. 1 depicts a system 100 for generating a blueprint of an application to be deployed in a cloud computing environment, according to one embodiment of the present disclosure. Via user input selections, a client application 102 interacts with an application director 108 to generate a blueprint 126 that specifies a logical topology of an application 136 to be deployed. Client application 102 and application director 108 may be software applications running in different hosts and/or virtual machines (not shown) in a client-server relationship, or on a same host or virtual machine (VM). In one embodiment, application director 108 may be a web-based application that may be accessed via client application 102, e.g., a web browser, although other implementations may be used. Client application 102 may be configured to render a graphical user interface (GUI) 140 on a display device (not shown) communicatively connected to the host and/or virtual machine on which client application 102 executes.

In one embodiment, client application 102 includes a graph layout manager 104 and a Scalable Vector Graphics (SVG) layout engine 106 configured to render a blueprint 126 for creation of a new blueprint or modification of an existing blueprint in a GUI 140 of client application 102. In one embodiment, graph layout manager 104 may be responsible for the position and sizing of overall blueprint layouts, line connections, cross-node dependencies. SVG layout engine 106 may be responsible for relative position of text and decoration within each node. In one embodiment, graph layout manager 104 and SVG layout engine 106 may be client-side libraries of scripting code provided by application director 108 and executable by client application 102 to programmatically render graphical elements of GUI 140 on a display device. In some implementations, e.g., where application director 108 is a web-based application, graph layout manager 104 and SVG layout engine 106 are JavaScript libraries downloaded from application director 108 to render a GUI 140 comprised of web documents, e.g., HTML, SVG, Cascading Style Sheets (CSS). For example, when a user directs client application 102 to access a Uniform Resource Locator (URL) pre-assigned to application director 108, application director 108 may return in response web documents (e.g., HTML, CSS, SVG), client-side code (e.g., JavaScript, in-line or linked files) which may include graph layout manager 104 and SVG layout engine 106, and multimedia files (e.g., GIFs, Flash, MPEGs) that client application 102 uses to render GUI 140. While the present disclosure describes functions performed by each of client application 102 and application director 108, it should be recognized that other embodiments may differently distribute functions between client application 102 and application director 108, i.e., shift functionality to server-side or client-side.

In operation, a user (e.g., software developer) may access application director 108 via client application 102 to design a topology for and orchestrate deployment of a multi-tier application 136 onto one of deployment environments 112 provided by a cloud computing platform provider 110. In one implementation, the user may utilize a graphical user interface provided by application director 108 to assemble and arrange items from a catalog into an application blueprint 126, for an application to be deployed, that includes a logical topology of virtual computing resources and application components for supporting application 136. Cloud computing platform provider 110 (sometimes referred to simply as "cloud provider") may provide multiple deployment environments 112, for example, for development, testing, staging, and production of the application. Services may be accessed from cloud computing platform provider 110, for example, via REST (Representational State Transfer) APIs (Application Programming Interface) or any other client-server communication protocol. One particular implementation of a REST API for cloud computing services is vCloud Director API available from VMware, Inc. Cloud computing platform provider 110 provisions virtual computing resources (e.g., virtual machines, or "VMs," 114) to provide a deployment environment 112 in which the user can deploy its multi-tier application. One particular example of a deployment environment is one implemented using cloud computing services from a vCloud DataCenter available from VMware, Inc.

In one embodiment, application director 108 includes the following software modules: a topology generator 120, a deployment plan generator 122, and a deployment director 124. Topology generator 120 generates a blueprint 126 that specifies a logical topology of the application 136 to be deployed. As mentioned earlier, blueprint 126 generally captures the structure of an application 136 as a collection of application components executing on virtual computing resources.

Blueprint 126 provides a visual representation of an applications' architecture, including, in one embodiment, one or more virtual machines (VMs) nodes, software services within the VM nodes, executable components within the VM nodes or software services. Blueprint 126 further provides a visual representation of component dependency connections. The dependency connections represent the architectural relationship between blueprint components and affect various lifecycles of the application. For instance, if a service A depends on service B, during deployment, the installation and configuration of service A will be waiting for the completion of service B. In some embodiments, blueprint 126 may visually represent one or more logical networks, for example, via visual aids to conventionally distinguish and manage logical networks between VM nodes.

For example, blueprint 126 generated by application director 108 for an online store application may specify a web application (e.g., in the form of a Java web application archive or "WAR" file comprising dynamic web pages, static web pages, Java servlets, Java classes, and other property, configuration and resources files that make up a Java web application) executing on an application server (e.g., Apache Tomcat application server) and that uses as a database (e.g., MongoDB) as a data store. It is recognized that the term "application" is used herein to generally refer to a logical deployment unit, comprised of application packages and their dependent middleware and operating systems. As such, in the example described above, the term "application" may refer to the entire online store application, including application server and database components, rather than just the application logic of the web application itself.

Blueprint 126 may be assembled out of items from a catalog 130, which is a listing of available virtual computing resources (e.g., VMs, networking, storage) that may be provisioned from cloud computing platform provider 110 and available application components (e.g., software services, scripts, code components, application-specific packages) that may be installed on the provisioned virtual computing resources. Catalog 130 may be pre-populated and customized by an administrator (e.g., IT or system administrator) that enters in specifications, configurations, properties, and other details about each item in catalog 130. Blueprint 126 may define one or more dependencies between application components to indicate an installation order of the application components during deployment. For example, since a load balancer usually cannot be configured until a web application is up and running, the user may specify a dependency from an Apache service to an application code package.

Deployment plan generator 122 of application director 108 generates a deployment plan 128 based on blueprint 126 that includes deployment settings for blueprint 126 (e.g., virtual computing resources' cluster size, CPU, memory, networks) and an execution plan of tasks having a specified order in which virtual computing resources are provisioned and application components are installed, configured, and started. Deployment plan 128 provides an IT administrator with a process-oriented view of blueprint 126 that indicates discrete steps to be performed to deploy application 136. Different deployment plans 128 may be generated from a single blueprint 126 to test prototypes (e.g., new application versions), to scale-up and scale down deployments, or deploy application 136 to different deployment environments 112 (e.g., testing, staging, production).

Deployment director 124 of application director 108 executes deployment plan 128 by communicating with cloud computing platform provider 110 via a cloud interface 132 to provision and configure VMs 114 in a deployment environment 112, as specified by deployment plan 128. Cloud interface 132 provides a communication abstraction layer by which application director 108 may communicate with a heterogeneous mixture of cloud provider 110 and deployment environments 112. Deployment director 124 provides each VM 114 with a series of tasks specific to the receiving VM 114 (herein referred to as a "local deployment plan"). The tasks may be scripts that are executed by VMs 114 to install, configure, and/or start one or more application components. For example, a task may be a script that, when executed by a VM 114, causes VM 114 to retrieve and install particular software packages from a central package repository 134. Deployment director 124 coordinates with VMs 114 to execute the tasks in an order that observes installation dependencies between VMs 114 according to deployment plan 128. After application 136 has been deployed, application director 108 may be utilized to monitor and modify (e.g., scale) the deployment.

Figure 2:
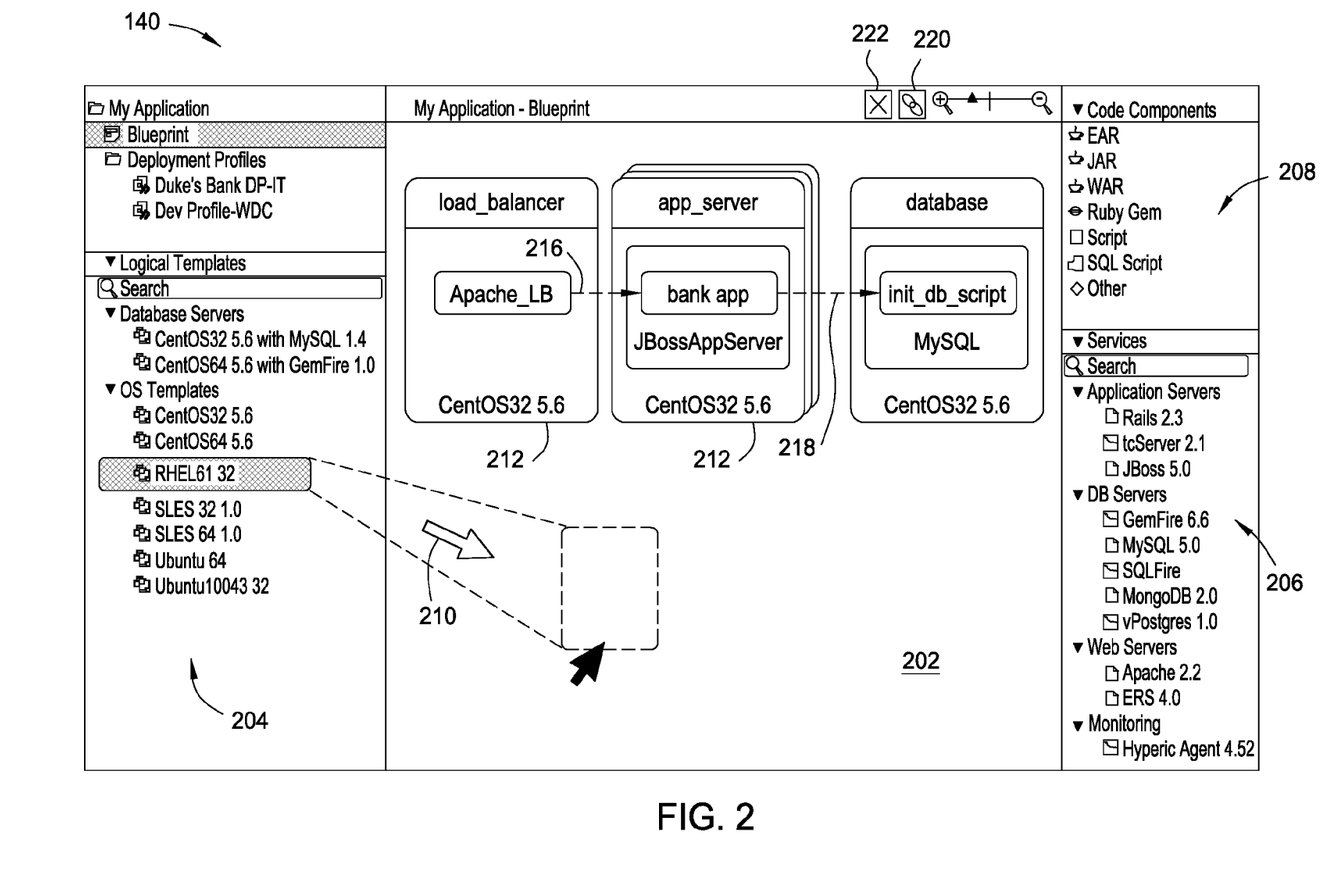
FIG. 2 illustrates an example graphical user interface for specifying an application blueprint for an application to be deployed.

FIG. 2 illustrates an example graphical user interface 140 for specifying a blueprint 126 for an application to be deployed. GUI 140 includes a canvas 202 that provides a graphical view of a blueprint 126 as a schematic diagram of application 136. GUI 140 may include one or more "palettes" that display items from catalog 130 that are available for use in creating a blueprint. Canvas 202 is configured to provide drag-and-drop functionality that enables the user to select and drag an item from the palettes and drop the selected item within the boundaries of canvas 202 to insert the selected item into blueprint 126, as illustrated by arrow 210.

In one embodiment, graph layout manager 104 is configured to generate one or more "nodes" 212, which visually represent virtual computing resources (e.g., a virtual machine, or a cluster of virtual machines) configured according to a user's selection. Graph layout manager 104 may be configured to initially generate nodes for GUI 140 upon first loading of GUI 140, and may be configured to modify GUI 140 to add, remove, or modify the nodes responsive to user input (e.g., user drags in a new VM). SVG layout engine 106 is configured to generate graphical elements that render contents of node 212 in GUI 140 according to techniques described herein.

In the embodiment shown in FIG. 2, GUI 140 includes a first palette 204 that lists logical templates defined in and available from catalog 130, a second palette 206 that lists software services defined in and available from catalog 130, and a third palette 208 that lists types of code components that may be inserted into a blueprint. A blueprint may include any resource, and a resource can be any of virtual machines, guest operating systems, application services, any network/storage resources (e.g., load balancers, storage arrays), or other software resources like Active Directory entries.

A blueprint may include one or more instances of logical templates, which specify virtual computing resources for a virtual machine, such as CPU, memory, networking, storage, guest operating system, pre-installed installed runtime environments (e.g., Java Runtime Environment), and application services and commands (e.g., ssh, wget). For example, one logical template may specify a virtual machine having a 2 GB of RAM, a dual-core CPU, and pre-installed guest operating system CentOS version 5.6 supporting 32-bit architecture, while another logical template may specify a virtual machine having Red Hat Enterprise Linux 6.1 supporting 64-bit architecture. Logical templates enable application director 108 to define an application topology in a cloud-agnostic manner. In some embodiments, the logical templates may be mapped to virtual machine templates made available by cloud provider 110 (referred to herein as "cloud templates".)

In one example, to create a blueprint that models a three-tiered application, a user may select three items from palette 204 of logical templates, drag the items onto canvas 202, and create three nodes representing each tier of the application. In the example shown in FIG. 2, a three-tiered application with a database backend, an application server, and a load balancer is visually represented by three nodes 212 (labeled as "load_balancer," "app_server," and "database"). Each node 212 has been created from a logical template (identified as "CentOS32 5.6") having CentOS 5.6 32-bit operating system installed.

A blueprint 126 may further include one or more application components, such as software services and code components, to be installed on a virtual machine for supporting execution of an application. Code components refer to application-specific binaries, scripts, or processes, for example, written by a developer and packaged into one or more files, to provide logic for the application. In catalog 130, code components are represented as types or formats of scripting and application code. Examples of types of code components include Java Archive (JAR) files, Java Enterprise Archive (EAR) files, Java web application archive (WAR) files, Ruby Gems packages, SQL scripts, and other suitable modules of scripting logic. Services are scripted software that provide a software infrastructure for an application, and are generally reused in multiple applications. Examples of services include application servers (e.g., Rails, Apache Tomcat, JBoss), database servers (e.g., GemFire, MySQL, SQLFire, MongoDB, Postgres), monitoring services (e.g., Hyperic, SpringInsight), web servers (e.g., Apache, VMware vFabric Enterprise Ready Server), messaging services (e.g., RabbitMQ), and other middleware services.

In one embodiment, application components may be added to a node 212 within canvas 202 to specify which application components are to execute on the node. For example, the user may select an application component (e.g., code component, software service) from palettes 206, 208 and drag the item into a node 212 within canvas 202 to specify the node should have the selected item executing therein. In the example three-tiered application in FIG. 2, a user has added a MySQL database item, a JBoss application server, and an Apache web server from palette 206 of services to nodes 212. Each node may host multiple application components. Some application components, such as services, may host, execute, and/or deploy certain application components themselves, such as code components. In the three-tiered application example above, the user specifies an application component packaged as an EAR file (identified as "bank_app") as being deployed in the JBoss application server. In another example, the user may specify an SQL script (identified as "init_db_script") that is executed by the MySQL database to initialize the database.

In one embodiment, graph layout manager 104 may be configured to render deployment-related dependencies 216, 218 between application components and/or nodes within canvas 202. The user may select two application components within canvas 202 using a pointer cursor in GUI 140, and create a dependency between the application components via a link button 220. It is appreciated that the user may later use a pointer cursor to select an existing dependency and delete and/or modify the selected dependency, for example, by pressing a delete button 222. In the three-tiered application example shown in FIG. 2, a dependency from the Apache load balancer to code component (e.g., "bank_app") is depicted by dashed arrow 216 and represents that the Apache load balancer should be deployed after the installation of the code component (e.g., "bank_app") is completed. Similarly, a second dependency (depicted by dashed arrows 218) from the code component (e.g., "bank_app") to the database initialization script (e.g., "init_db_script") is created to represent that the code component (e.g., "bank_app") should wait until the database node, the database service, and the SQL script initializing the database have all been run before continuing.

In one embodiment, blueprint 126 is rendered using Scalable Vector Graphics (SVG), which is an XML-based vector image format supported by web browsers and other applications (e.g., client application 102). While SVG is a powerful graphics specification, SVG lacks the native support of a sophisticated layout mechanism. All SVG elements are absolutely positioned and sized within their SVG containers. For a complex blueprint, manually specifying the positions and sizes of each child element (e.g., text, images, backgrounds) may greatly increase software development costs of applications having topology generators (e.g., an application director 108) and make code of such applications difficult to maintain. It is recognized that, while embodiments herein are described in detail using SVG, the disclosed techniques for generating a graphical user interface may be applied using other image formats including other vector-based formats and raster-based formats.

Accordingly, in one or more embodiments, SVG layout engine 106 is configured to parse a declarative layout configuration and translate the declarations into actual SVG elements that render content within a node 212. SVG layout engine 106 is configured to determine positional informational for child elements within a node 212, and generate SVG elements including text, images, and graphic shapes that visually represent the child elements within each node 212, using the determined positional information.

Figure 3:
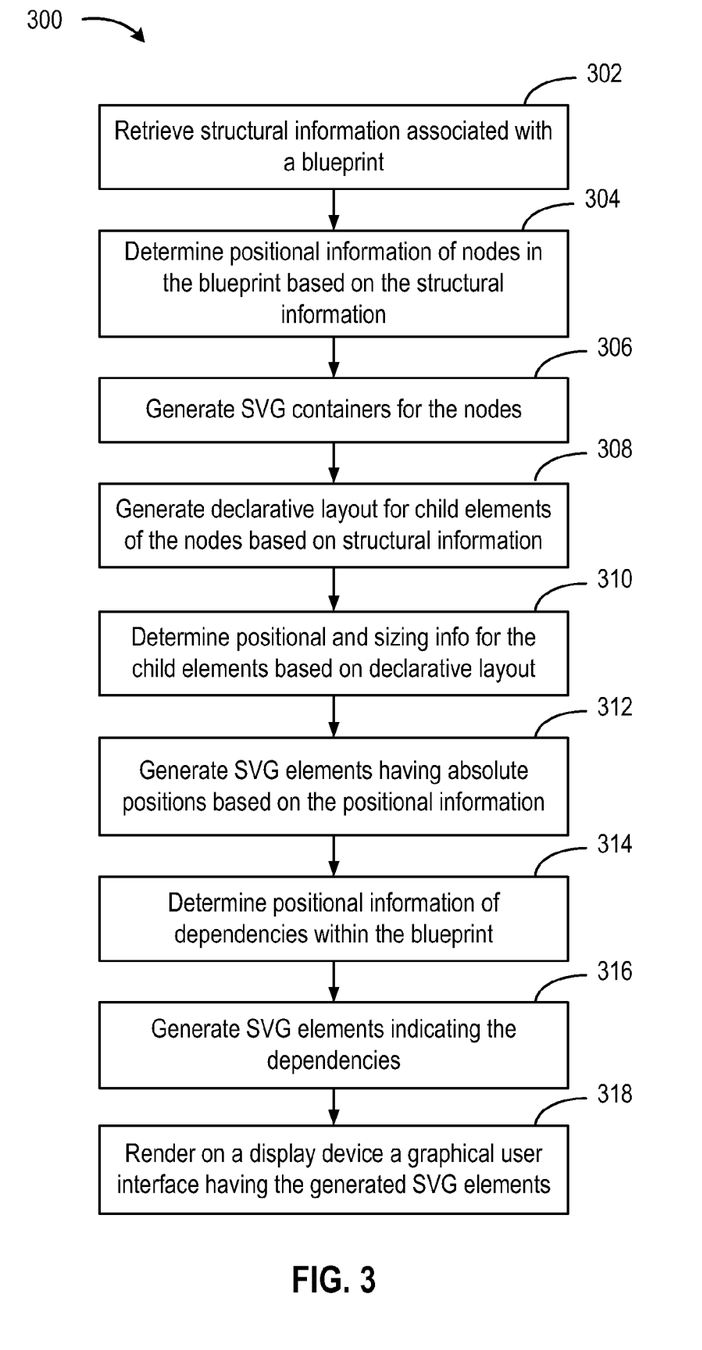
FIG. 3 is a flow diagram of a method for generating a graphical user interface of an application for specifying a logical topology, according to one embodiment of the present disclosure.

FIG. 3 is a flow diagram of a method 300 for generating a graphical user interface of an application (e.g., application director 108) for specifying a logical topology, according to one embodiment of the present disclosure. Method 300 for generating a GUI may be performed in response to user input requesting to create a new blueprint 126 or modify an existing blueprint 126. While method 300 is described in conjunction with the system shown in FIG. 1, it is recognized that other systems may be utilized to perform the method described herein.

At step 302, graph layout manager 104 retrieves from application director 108 structural information associated with a blueprint. The structural information specifies a logical topology comprised of nodes, application components within the nodes, and deployment dependencies between the application components and/or the nodes. In one implementation, graph layout manager 104 may retrieve structural information formatted in a JavaScript Object Notation (JSON) format via a REST API provided by application director 108, although other data formats and other techniques for transmitting data may be utilized.

In one example, the structural information associated with the example blueprint shown in FIG. 2 may be a data structure containing a first entry corresponding to a first node ("load_balancer"), a second entry corresponding to a second node ("app_server"), and a third entry corresponding to a third node ("database"). Each entry may specify the content within the corresponding node. For example, the first entry may specify a label associated with the first node ("load$_{13}$ balancer"), the logical template associated with the first node ("CentOS32 5.6"), and any application components contained within the first node, such as the software service Apache Load Balancer. Content within a node may be specified in a nested manner, i.e., as child elements of the node parent element. For example, the second entry corresponding to the second node may include a child element corresponding to the application component JBoss Application Server, which itself includes a child element corresponding to a code component ("bank_app").

At step 304, graph layout manager 104 of client application 102 determines positional information of nodes in blueprint 126 based on the structural information. In one embodiment, where the structural information is contained an array-like data structure, graph layout manager 104 steps through each entry in the structural information and assigns a logical position to each node within canvas 202. A logical position as used herein refers to abstract positional information distinguished from pixel-based coordinate values. For example, graph layout manager 104 may process the structural information and assign a first logical position at (0,0) to the first node, a second logical position at (0,1) to the second node, and a third logical position at (0,2) to the third node. Graph layout manager 104 may further iterate through each level in the structural information and specify logical positions for content within each node. For example, the Apache load balancer component within the first node may be assigned a first logical position (0,0) relative to the first node.

At step 306, graph layout manager 104 generates one or more SVG container elements for the nodes based on the determined positional information. Each SVG container element may correspond to a node. In one implementation, graph layout manager 104 generates an <svg> element that creates an SVG document fragment which may exist inside another document, such as an HTML document, or canvas 202, and which has its own viewport and coordinate system. In other implementations, other SVG container or structural elements, such as the <g> element used to group together elements, may be used. In one embodiment, graph layout manager 104 determines and sets absolute positions of the SVG containers within canvas 202.

As used herein, generating an SVG element (e.g., container elements, shapes, graphics elements, text content elements) may refer to using client-side scripting code to programmatically generate and/or modify an object inserted into a Document Object Model (DOM) of GUI 140. For example, a method call such as createElement(namespace, "svg") may be used to instantiate an SVG element of a specified tag (e.g., "svg"). A method call such as setAttribute ("x", value) may be used to specify or dynamically modify one or more attributes of an SVG element. A method call such as appendChild( ) may be used to dynamically insert the SVG element into the DOM for rendering. It is recognized that client application 102 may be configured to automatically re-render GUI 140 or portion of GUI 140 on the display device in response to changes (e.g., insertions) to the DOM. While the described techniques may be implemented using programmatic manipulation of SVG elements, it is understood that, in some embodiments, generating an SVG element may include generation of markup text including one or more tags (e.g., <svg>, </svg>, <polygon>, etc.) and the one or more attributes that define the SVG element.

At step 308, graph layout manager 104 generates a declarative layout for child elements of the nodes based on structural information 116. The child elements in a node and the layout of those child elements may be specified in a list of item declarations. In one embodiment, the item declarations associated with the child elements in the nodes may be generated by graph layout manager 104 while processing the structural information (i.e., in step 304). For example, in one implementation, graph layout manager 104 may traverse structural information 116, and responsive to encountering a particular type of topology component (e.g., node, software service, code component, etc.), generate and insert a corresponding item declaration for that type of topology component into a growing data structure to build a declarative layout. In other embodiments, the item declarations associated with the child elements in the nodes may be contained in the structural information as retrieved from application director 108. An example declarative layout for content in the nodes is shown in Table 1 below. While Table 1 depicts one particular syntax for item declarations formatted as a JSON data structure, it is understood that other syntaxes and data structure formats may be used.

TABLE 1

Sample item declarations

| | |
|---|---|
| 01 | [ { |
| 02 | gtype: 'rect', |
| 03 | width: '100%', |
| 04 | height: '100%', |
| 05 | attrs: { |
| 06 | stroke: 'black' |
| 07 | } |
| 08 | }, { |
| 09 | layout: { |
| 10 | type: 'vbox', |
| 11 | margin: 5 |
| 12 | }, |
| 13 | items: [ { |
| 14 | gtype: 'text', |
| 15 | attrs: { |
| 16 | text: 'Line 1' |
| 17 | } |
| 18 | }, { |
| 19 | gtype: 'text', |
| 20 | attrs: { |
| 21 | text: 'Line 2' |
| 22 | } |
| 23 | } ] |
| 24 | } ] |

The example shown in Table 1 includes a first item declaration (i.e., lines 02-07) specifying a box, and a second item declaration specifying two lines of text within the box (i.e., lines 09-23). Item declarations may be defined in a hierarchical manner, such that one item declaration can contain "child" item declarations. For example, the second item declaration contains two sub-items corresponding to a first line of text (i.e., lines 13-18) and a second line of text (i.e., lines 18-23).

At step 310, SVG layout engine 106 parses the declarative layout and determines positional and sizing information for the child elements based on the declarative layout. SVG layout engine 106 may determine absolute positions, heights, and widths for each child element in a node based on the declarative layout. In one implementation, SVG layout engine 106 performs multiple passes on the declarative layout, for example, by first calculating heights and widths of elements, then calculating absolute positions of those elements as offset by the heights and widths of neighboring elements. The absolute positions of an SVG element may be specified as X-axis and Y-axis coordinate values relative to an ancestor SVG container element corresponding to a node, or in some embodiments, relative to canvas 202. For example, the absolute positions of an SVG element within a node may be specified relative to a coordinate system having an (0,0) location at the upper left corner of a node, such that X-axis coordinates increase rightward and Y-axis coordinates increase downward, although other coordinate systems may be used. It is understood that while the present disclosure may express positional information and sizing information in terms of pixel values, other units of measurement may be used, such as centimeters, millimeters, inches, picas, points, units relative to the default font size (i.e., em), units relative to the height of a particular font character (i.e., ex).

<rect width="100" height="100" stroke="black" fill="none"></rect>
<text x="5" y="16" width="90">Line 1</text>
<text x="5" y="36" width="90">Line 2</text>

Table 2: Sample SVG Document Based on Item Declarations

Figure 4:
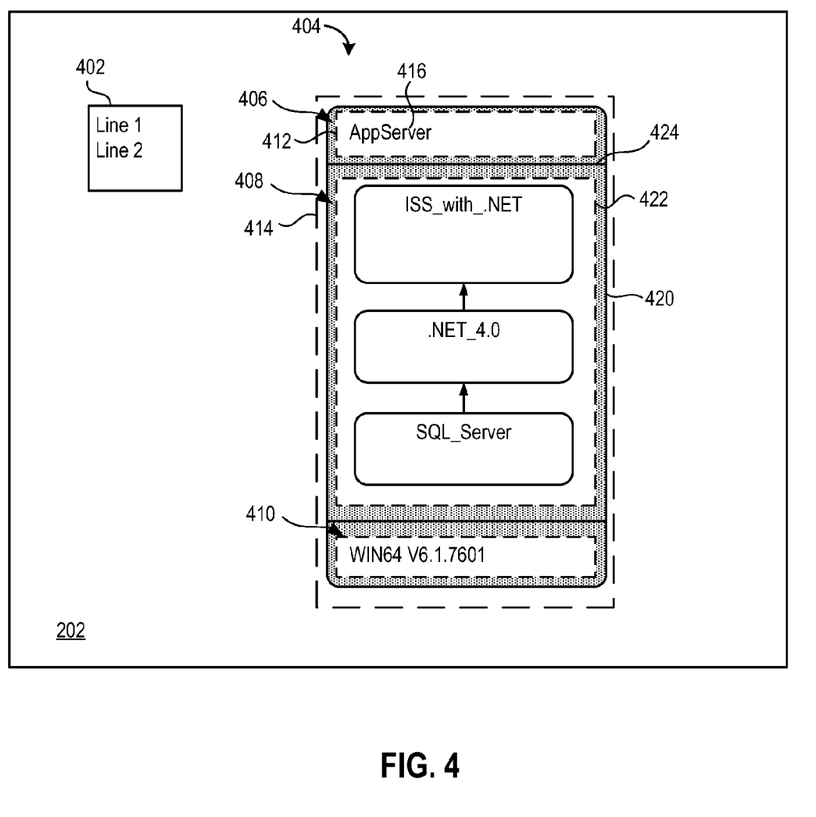
FIG. 4 is a block diagram depicting a layout model for child elements within a node specified by one or more item declarations, according to one embodiment of the present disclosure.

Assuming an SVG container component size is 100 ×100, SVG layout engine 106 may translate the example item declarations of Table 1 into the SVG document shown above in Table 2 . To create the resultant SVG document, SVG layout engine 106 calculates the absolute positions and sizes of child elements based on properties specified by the item declarations, e.g., width, height, and margin properties. SVG layout engine 106 determines a 100-pixel width and height for the <rect> element based on the "width:100%" and "height:100%" specified in the item declaration. SVG layout engine 106 further determines the absolute position of "x=5" for the text elements based on the "margin:5" specified in the item declaration. SVG layout engine 106 further determines the absolute position of "y=16" for the first text element, and determines the absolute position of "y=36" for the second text element, which accounts for the margin (i.e., 5) and the height of the first text element (i.e., 20) preceding the second text element. It is recognized that the text elements have a Y-coordinate of "16" and "36" instead of "5" and "25" because SVG text element's Y-coordinate starts with their baseline instead of their top by default, and SVG layout engine 106 automatically offsets the text based on the text element's height. The SVG elements shown in Table 2 are rendered to display two lines of text within a box 402, as depicted in FIG. 4.

Each item declaration may specify a plurality of properties for the associated child element, which are used in translating the declaration into actual SVG elements. A graphics type property (e.g., "gtype") specifies a type of graphical element the item declaration is associated with. In some embodiments, the graphics type property corresponds to a specific SVG element, e.g., a "rect" graphics type declares the item as an SVG rectangular shape element (<rect>); a "text" graphics type declares the item as an SVG text content element (<text>) element. It is recognized that the graphics type property does not necessarily have a strict one-to-one mapping with particular SVG elements, and does not necessarily assign a property value that is the same as the SVG tag, and that the graphics types may define a logical type that ultimately maps to any, including multiple, SVG element(s).

In one embodiment, an item declaration may include one or more attribute properties (e.g., "attrs") specifying attribute values for SVG elements. SVG layout engine 106 parses the attribute properties and may include the attribute values directly into the SVG element. Some attribute values may be "passed" through directly to the resultant SVG element, such as the "stroke:'black'" attribute (i.e., line 06 of Table 1) of the <rect> element. In another example, SVG layout engine 106 parses a text attribute property specifying the textual data of the respective text element (i.e., lines 16 and 21 of Table 1), and inserts the textual data as the SVG text element's content.

In one embodiment, an item declaration may specify a layout property indicating a type of layout for determining positional information of one or more associated child elements in sequence. The layout property may specify a directional layout (e.g., horizontal, vertical) where child elements within that layout are positioned one after another in sequence in a particular direction, for example, in a top-to-bottom direction for a vertical layout, and in a left-to-right direction for a horizontal layout. SVG layout engine 106 calculates the absolute position of each child element as the position of a previous child element offset by at least the dimensions of the previous child element.

For example, SVG layout engine 106 parses the second item declaration in Table 1 specifying a vertical layout (i.e., "type: 'vbox'") and calculates the position of the second line of text to be the position of the first line of text offset vertically by at least the height of the first line of text. In another example, SVG layout engine 106 may parse an item declaration specifying a horizontal layout (e.g., "type: 'hbox'") and calculates the position of a child element to be the position of the previous child element offset horizontally by at least the width of the previous child element. It is understood that other types of layouts may be utilized. In some embodiments, if no layout is explicitly specified, a pre-determined default layout may be applied. For example, a default layout (i.e., "type: 'auto'") places the child element using absolute positions within the current container. Even with absolute positioning, the child element may take advantage of dynamic layout calculation to support width and height in percentage of parent dimensions and margins.

In some embodiments, the layout property may specify one or more sub-properties that are applied to the positioning of all child elements associated with the layout property. The layout property may include a margin property that applies a margin around all child elements associated with the layout property. For example, in response to parsing the second item declaration in Table 1 specifying a margin property of 5 pixels (i.e., line 11: "margin: 5"), SVG layout engine 106 calculates the position of a child element to be the position of the previous child element offset vertically by a 5 pixel margin in addition to the height of the previous child element. In some embodiments, the layout property may specify an alignment value (e.g., "align: center") which enables one or more child elements to be horizontally or vertically and/or left- , center- , or right-aligned within its respective container. In response to parsing an item declaration containing an alignment property, SVG layout engine 106 may calculate a position of a child element based on the position and size of the child element's parent element and further based on the calculated size of the child element itself For example, for a horizontally-centered child element, SVG layout engine 106 may calculate the position of the child element based on 50% of the width of the parent element offset by 50% of the width of the child element itself.

In one embodiment, as item declarations may be nested within other item declarations, it is recognized that layouts may be nested within other layouts. FIG. 4 is a block diagram depicting a layout model for child elements within a node specified by one or more item declarations. A node 404 rendered within canvas 202 includes a polygon shape 420, and a header portion 406, a main portion 408, a footer portion 410 and line shapes 424 arranged in a vertical layout.

Child elements of header portion 406 having a horizontal layout (depicted as a box 412) is nested within an overall vertical layout (depicted as a box 414) for portions 406, 408, 410. For example, header portion 406 includes title text 416 ("AppServer") positioned according to a horizontal layout. Child elements within main portion 408 may also have its own layout (depicted as box 422) for positioning application components, depicted as a combination of rectangular elements and text elements "ISS_with.NET", ".NET_4.0", and "SQL_Server". In the example shown, the item declaration for child elements within main portion 408 specify a horizontally centered layout for the application components. Child elements within footer portion 410 includes template text ("WIN64 V6.1.7601") indicating the logical template associated with the node positioned according to another horizontal layout.

In one embodiment, SVG layout engine 106 may be configured to support layout flex, where remaining space in a node is dynamically allocated to child elements based on their respective flex value. An item declaration may specify a flex value that indicates a weighted value relative to other flex values according to which sizing information for an element is changed (i.e., "flexed") based on any remaining space. SVG layout engine 106 may increase (or even decrease) the size of a child element by a proportion of remaining space based on the child element's flex value relative to the total flex value of all child elements. For example, a first child element with a flex value of "2" among two other child elements having a flex value of "1" would have its width increased by an amount of 50% of the remaining space. Flex values may include both horizontal and vertical flex values for allocating remaining space to widths and heights of child elements, respectively.

In one embodiment, SVG layout engine 106 may be configured to support automatic text truncation based on the text size and dimensions of the text's parent elements. SVG layout engine 106 may determine that an item declaration associated with a text element specifies a text truncation property (e.g., "text-trunc: ellipsis"). SVG layout engine 106 then determines whether the full text within the text element as rendered according to a given text size would exceed the boundaries of the text element's parent element(s). If so, SVG layout engine 106 truncates a portion of the full text such that that text element does not exceeds the boundaries, taking into account margins and other layout requirements. SVG layout engine 106 generates an SVG text element having the truncated text, and optionally includes an ellipsis character or other indication that the text has been truncated.

Referring back to FIG. 3, at step 312, SVG layout engine 106 generates a plurality of SVG elements having absolute positions and sizes based on the determined positional information. SVG layout engine 106 generates one or more SVG elements having attributes specified according to the determined positional and sizing information. In one embodiment, for each item declaration, SVG layout engine 106 may call a method such as createElement(<tagname>) to instantiate a SVG element of a specified tag (e.g., "text", "rect") based on the graphics type property specified by the item declaration. SVG layout engine 106 may call a method, e.g., setAttribute(<name>, <value>), that sets position attributes (e.g., "x", "y") and size attributes (e.g., "height", "width") of the generated SVG element according to the determined positional and sizing information. SVG layout engine 106 may call a method call, e.g., appendChild(child) that inserts the generated SVG element into the node for rendering.

At step 314, graph layout manager 104 determines positional information of dependencies between application components within the blueprint, if any. In response to SVG layout engine 106 calculating positional and sizing information for child elements within the nodes, graph layout manager 104 may proceed to determine positional information for drawing shapes (e.g., lines, arrows) connecting child elements within a node and child elements between nodes. In other words, after SVG layout engine 106 has finished calculating the absolute positions of a first application component and a second application component, graph layout manager 104 may determine where to draw a line connecting the application components that visually represents a dependency between the application components, such as dependency 218 shown in FIG. 2.

At step 316, graph layout manager 104 generates one or more SVG element(s) indicating the dependencies between application components and/or nodes of the blueprint. The generated SVG elements that visually represent the dependencies may include the determined positional information. For example, graph layout manager 104 may generate an SVG line element having "x 1" and "y1" attributes associated with a starting position of the dependency and "x2" and "y2" attributes associated with an ending position of the dependency.

At step 318, client application 102 renders, on a display device, a GUI 140 including the plurality of generated SVG elements representing an application blueprint, which includes SVG containers, SVG elements corresponding to child elements of the nodes, and SVG elements indicating deployment dependencies. It is recognized that, rather than generate the GUI entirely at once, client application 102 may render portions of GUI 140 comprising subsets of the generated SVG elements in an iterative manner and/or in an intermittent manner as SVG elements are generated according to method 300 (e.g., after steps 306, 312, 316, etc.)

While embodiments disclosed herein are discussed with regards to generating an initial GUI for a blueprint, operations for modifying an existing GUI based on changes to the blueprint may be performed utilizing techniques described herein. In one embodiment, graph layout manager 104 may detect a change to application blueprint 126 in response to user input. For example, a user may insert a new node into canvas 202, remove an existing node from canvas 202, insert a new application component within a node, move an application component to a different node, add or remove dependencies between application components and/or nodes.

In response to detecting a change to the blueprint, graph layout manager 104 may modify structural information 116 of blueprint 126 to reflect the detected change. Graph layout manager 104 may insert a new entry into structural information 116 representing a newly added node, delete an entry from structural information 116 corresponding to a deleted node, insert or delete child elements into structural information 116 corresponding to changes of application components. In one embodiment, graph layout manager 104 may then recalculate positional information for nodes in the blueprint. For example, insertion of a new node may bump other nodes into new logical positions, while in other embodiments, deletion of an existing node may result in no change in other nodes' logical position to improve visual stability and reduce GUI changes that are disorienting to the user. Graph layout manager 104 and SVG layout engine 106 may proceed to render blueprint 126 based on structural information 116, as described above. In some embodiments, graph layout manager 104 and SVG layout engine 106 may clear out and completely re-render canvas 202 using the updated structural information. In other embodiments, graph layout manager 104 and SVG layout engine 106 may modify only those portions of the GUI affected by the change in structural information 116.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of generating a user interface, the method comprising:
    retrieving structural information comprising a topology of virtual computing resources and application components executing thereon, wherein the structural information specifies a plurality of nodes corresponding to the virtual computing resources and a plurality of child elements of the plurality of nodes;
    generating a declarative layout associated with the plurality of child elements of the plurality of nodes according to the structural information, wherein the declarative layout is a text description of the structural information associated with the plurality of child elements;
    translating the declarative layout into a plurality of scalar vector graphics (SVG) elements that renders the plurality of child elements based on the declarative layout, comprising:
        parsing the text description to determine positional and sizing information for the plurality of child elements based on the declarative layout relative to the plurality of nodes; and
    rendering, on a display device, a graphical user interface comprising the plurality of SVG elements, wherein the graphical user interface visually represents the topology.

2. The method of claim 1, further comprising:
    determining absolute positions and sizes for each child element of the plurality of nodes based on the declarative layout, wherein the plurality of SVG elements are modified to specify the determined absolute positions and sizes.

3. The method of claim 1, further comprising:
    generating a plurality of SVG container elements associated with the plurality of nodes, wherein the plurality of SVG elements are inserted as children of the plurality of SVG container elements.

4. The method of claim 1, further comprising:
    determining the declarative layout specifies a directional layout for a first set of child elements in sequence, wherein the directional layout is selected from a group consisting of a vertical layout and a horizontal layout.

5. The method of claim 1, further comprising:
    detecting a change to the topology of virtual computing resources and application components executing thereon;
    modifying the structural information based on the detected change to the topology; and
    modifying at least one of the plurality of SVG elements based on the modified structural information.

6. The method of claim 1, wherein translating the declarative layout into the plurality of scalar vector graphics (SVG) elements that renders the plurality of child elements based on the declarative layout further comprises:
    instantiating a document object comprising an SVG element;
    modifying a position attribute and a size attribute of the document object based on the declarative layout; and
    inserting the document object into a web document.

7. The method of claim 1, wherein translating the declarative layout into the plurality of scalar vector graphics (SVG) elements that renders the plurality of child elements based on the declarative layout further comprises:
    generating markup text defining the plurality of SVG elements having a position attribute and a size attribute, wherein the position attribute comprises an absolute position calculated based on the declarative layout.

8. The method of claim 1, wherein the declarative layout comprises a data structure formatted in a JavaScript Object Notation (JSON) format.

9. A non-transitory computer-readable storage medium comprising instructions that, when executed in a computing device, generate a user interface, by performing the steps of:
    retrieving structural information comprising a topology of virtual computing resources and application components executing thereon, wherein the structural information specifies a plurality of nodes corresponding to the virtual computing resources and a plurality of child elements of the plurality of nodes;
    generating a declarative layout associated with the plurality of child elements of the plurality of nodes according to the structural information, wherein the declarative layout is a text description of the structural information associated with the plurality of child elements;
    translating the declarative layout into a plurality of scalar vector graphics (SVG) elements that renders the plurality of child elements based on the declarative layout, comprising:
        parsing the text description to determine positional and sizing information for the plurality of child elements based on the declarative layout relative to the plurality of nodes; and
    rendering, on a display device, a graphical user interface comprising the plurality of SVG elements, wherein the graphical user interface visually represents the topology.

10. The non-transitory computer-readable storage medium of claim 9, wherein the steps further comprise:
    determining absolute positions and sizes for each child element of the plurality of nodes based on the declarative layout, wherein the plurality of SVG elements are modified to specify the determined absolute positions and sizes.

11. The non-transitory computer-readable storage medium of claim 9, wherein the steps further comprise:
    generating a plurality of SVG container elements associated with the plurality of nodes, wherein the plurality of SVG elements are inserted as children of the plurality of SVG container elements.

12. The non-transitory computer-readable storage medium of claim 9, wherein the steps further comprise:
    determining the declarative layout specifies a directional layout for a first set of child elements in sequence, wherein the directional layout is selected from a group consisting of a vertical layout and a horizontal layout.

13. The non-transitory computer-readable storage medium of claim 9, wherein the steps further comprise:
    detecting a change to the topology of virtual computing resources and application components executing thereon;
    modifying the structural information based on the detected change to the topology; and
    modifying at least one of the plurality of SVG elements based on the modified structural information.

14. The non-transitory computer-readable storage medium of claim 9, wherein translating the declarative layout into the plurality of scalar vector graphics (SVG) elements that renders the plurality of child elements based on the declarative layout further comprises:
  instantiating a document object comprising an SVG element;
  modifying a position attribute and a size attribute of the document object based on the declarative layout; and
  inserting the document object into a web document.

15. The non-transitory computer-readable storage medium of claim 9, wherein translating the declarative layout into the plurality of scalar vector graphics (SVG) elements that renders the plurality of child elements based on the declarative layout further comprises:
  generating markup text defining the plurality of SVG elements having a position attribute and a size attribute, wherein the position attribute comprises an absolute position calculated based on the declarative layout.

16. The non-transitory computer-readable storage medium of claim 9, wherein the declarative layout comprises a data structure formatted in a JavaScript Object Notation (JSON) format.

17. A computer system for generating a user interface, comprising:
  a display device; and
  a processor programmed to carry out the steps of:
    retrieving structural information comprising a topology of virtual computing resources and application components executing thereon, wherein the structural information specifies a plurality of nodes corresponding to the virtual computing resources and a plurality of child elements of the plurality of nodes;
    generating a declarative layout associated with the plurality of child elements of the plurality of nodes according to the structural information, wherein the declarative layout is a text description of the structural information associated with the plurality of child elements;
    translating the declarative layout into a plurality of scalar vector graphics (SVG) elements that renders the plurality of child elements based on the declarative layout, comprising:
      parsing the text description to determine positional and sizing information for the plurality of child elements based on the declarative layout relative to the plurality of nodes; and
    rendering, on the display device, a graphical user interface comprising the plurality of SVG elements, wherein the graphical user interface visually represents the topology.

18. The computer system of claim 17, wherein the processor is further programmed to carry out the steps of:
  determining absolute positions and sizes for each child element of the plurality of nodes based on the declarative layout, wherein the plurality of SVG elements are modified to specify the determined absolute positions and sizes.

19. The computer system of claim 17, wherein the processor is further programmed to carry out the steps of:
  generating a plurality of SVG container elements associated with the plurality of nodes, wherein the plurality of SVG elements are inserted as children of the plurality of SVG container elements.

20. The computer system of claim 17, wherein translating the declarative layout into the plurality of scalar vector graphics (SVG) elements that renders the plurality of child elements based on the declarative layout further comprises:
  instantiating a document object comprising an SVG element;
  modifying a position attribute and a size attribute of the document object based on the declarative layout; and
  inserting the document object into a web document.

* * * * *